US008894581B2

United States Patent
Cho

(10) Patent No.: US 8,894,581 B2
(45) Date of Patent: Nov. 25, 2014

(54) PERFORMING ADAPTIVE FRAME AVERAGE PROCESS IN ULTRASOUND SYSTEM

(75) Inventor: Gae Young Cho, Seoul (KR)

(73) Assignee: Samsung Medison Co., Ltd., Kangwon-do (KR)

( * ) Notice: Subject to any disclaimer, the term of this patent is extended or adjusted under 35 U.S.C. 154(b) by 154 days.

(21) Appl. No.: 13/303,912

(22) Filed: Nov. 23, 2011

(65) Prior Publication Data

US 2012/0136252 A1 May 31, 2012

(30) Foreign Application Priority Data

Nov. 29, 2010 (KR) .................. 10-2010-0119280

(51) Int. Cl.
*A61B 8/00* (2006.01)
*G01S 7/52* (2006.01)

(52) U.S. Cl.
CPC .......... *G01S 7/52034* (2013.01); *G01S 7/52023* (2013.01)
USPC .......................................... 600/454; 600/453

(58) Field of Classification Search
CPC ................. A61B 1/00009; A61B 8/00; G06T 2207/10132; G06T 2207/20092; Y10S 128/916
USPC ................. 600/454, 455, 443, 453, 463, 441; 382/54, 6; 128/662.03; 361/11
See application file for complete search history.

(56) References Cited

U.S. PATENT DOCUMENTS

| | | | |
|---|---|---|---|
| 5,865,752 A * | 2/1999 | Seyed-Bolorforosh et al. | 600/454 |
| 6,139,497 A | 10/2000 | Amemiya et al. | |
| 7,153,268 B2 | 12/2006 | Li et al. | |
| 8,337,406 B2 | 12/2012 | Park et al. | |
| 2003/0092989 A1 | 5/2003 | Aichhorn et al. | |
| 2007/0078342 A1 | 4/2007 | Jago | |
| 2011/0295116 A1 | 12/2011 | Lee | |

FOREIGN PATENT DOCUMENTS

| | | | |
|---|---|---|---|
| JP | 07-115644 | A | 5/1995 |
| JP | 2007-504862 | A | 3/2007 |
| JP | 2007-512869 | A | 5/2007 |
| JP | 2009-090055 | A | 4/2009 |
| KR | 10-2011-0131857 | A | 12/2011 |
| KR | 10-1134842 | B1 | 4/2012 |
| WO | 2005/050571 | A2 | 6/2005 |

OTHER PUBLICATIONS

Korean Notice of Allowance, w/ English translation thereof, issued in Korean Patent Application No. KR 10-2010-0119280 dated Aug. 28, 2013.
Extended European Search Report issued in European Patent Application No. EP 11190251.6 dated Oct. 14, 2013.

* cited by examiner

*Primary Examiner* — Elmer Chao
(74) *Attorney, Agent, or Firm* — McDermott Will & Emery LLP

(57) ABSTRACT

There are provided embodiments for performing a frame average process based on a change of a frame rate are disclosed. In one embodiment, an ultrasound system comprises: an ultrasound data acquisition unit configured to sequentially acquire ultrasound data corresponding to a living body; and a processing unit configured to sequentially form a plurality of ultrasound images based on the ultrasound data, estimate a frame average coefficient corresponding to a change of a frame rate based on an $i^{th}$ (i is a positive integer) ultrasound image and an $i^{th}$ frame average image, and perform a frame average process between the $i^{th}$ frame average image and an $(i+1)^{th}$ ultrasound image based on the frame average coefficient to form an $(i+1)^{th}$ frame average image.

3 Claims, 5 Drawing Sheets

PERFORMING ADAPTIVE FRAME AVERAGE PROCESS IN ULTRASOUND SYSTEM

CROSS-REFERENCE TO RELATED APPLICATION

The present application claims priority from Korean Patent Application No. 10-2010-0119280 filed on Nov. 29, 2010, the entire subject matter of which is incorporated herein by reference.

TECHNICAL FIELD

The present disclosure generally relates to ultrasound systems, and more particularly to performing an adaptive frame average process based on a change of a frame rate in an ultrasound system.

BACKGROUND

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two-dimensional or three-dimensional ultrasound images of internal features of a target object (e.g., human organs).

The ultrasound system may transmit ultrasound signals to a living body and receive ultrasound signals (i.e., ultrasound echo signals) from the living body to form an ultrasound image corresponding to the living body. The ultrasound system may further perform a frame average process between a current ultrasound image and a previous ultrasound image (i.e., previous frame average image) by using an infinite impulse response filter to enhance quality of the ultrasound image (i.e., to improve a signal-to-noise ratio of the ultrasound image).

The ultrasound system may perform the frame average process based on a fixed frame average coefficient as the frame rate changes. However, this presents a problem since motion blurring occurs in the frame average image when the living body or a target object within the living body moves. Further, an ultrasound probe contacted on a surface of the living body is often moved.

SUMMARY

There are provided embodiments for performing an adaptive frame average process based on a change of a frame rate in an ultrasound system.

In one embodiment, by way of non-limiting example, an ultrasound system comprises: an ultrasound data acquisition unit configured to sequentially acquire ultrasound data corresponding to a living body; and a processing unit configured to sequentially form a plurality of ultrasound images based on the ultrasound data, estimate a frame average coefficient corresponding to a change of a frame rate based on an $i^{th}$ (i is a positive integer) ultrasound image and an $i^{th}$ frame average image, and perform a frame average process between the $i^{th}$ frame average image and an $(i+1)^{th}$ ultrasound image based on the frame average coefficient to form an $(i+1)^{th}$ frame average image.

In another embodiment, there is provided a method of performing an adaptive frame average process, comprising: a) sequentially acquiring ultrasound data corresponding to a living body; b) sequentially forming a plurality of ultrasound images based on the ultrasound data; c) estimating a frame average coefficient corresponding to a change of a frame rate based on an $i^{th}$ ultrasound image and an $i^{th}$ (i is positive integers) frame average image; and d) performing a frame average process between the $i^{th}$ frame average image and an $(i+1)^{th}$ ultrasound image based on the frame average coefficient to form an $(i+1)^{th}$ frame average image.

This summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
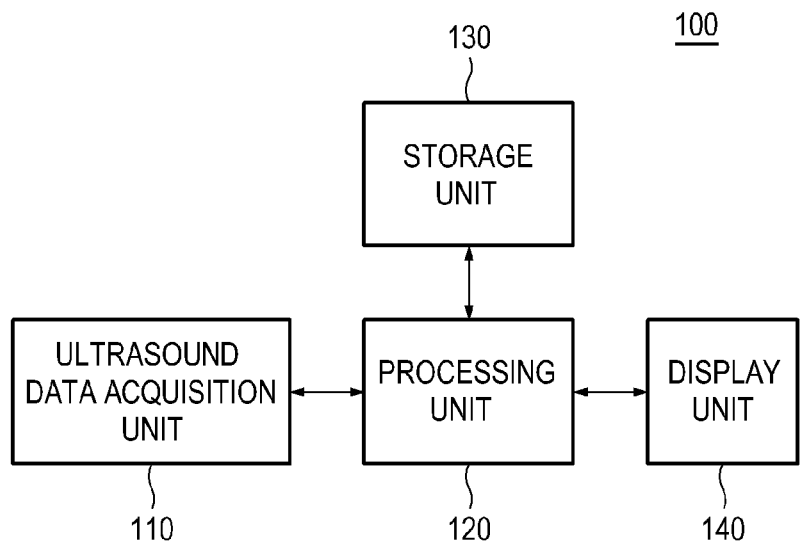
FIG. 1 is a block diagram showing an illustrative embodiment of an ultrasound system.

Referring to FIG. 1, an ultrasound system 100 in accordance with an illustrative embodiment is shown. As depicted therein, the ultrasound system 100 may include an ultrasound data acquisition unit 110.

The ultrasound data acquisition unit 110 may be configured to transmit ultrasound signals to a living body. The living body may include target objects (e.g., heart, liver, blood flow, etc.). The ultrasound data acquisition unit 110 may be configured to receive ultrasound signals (i.e., ultrasound echo signals) from the living body to acquire ultrasound data.

Figure 2:
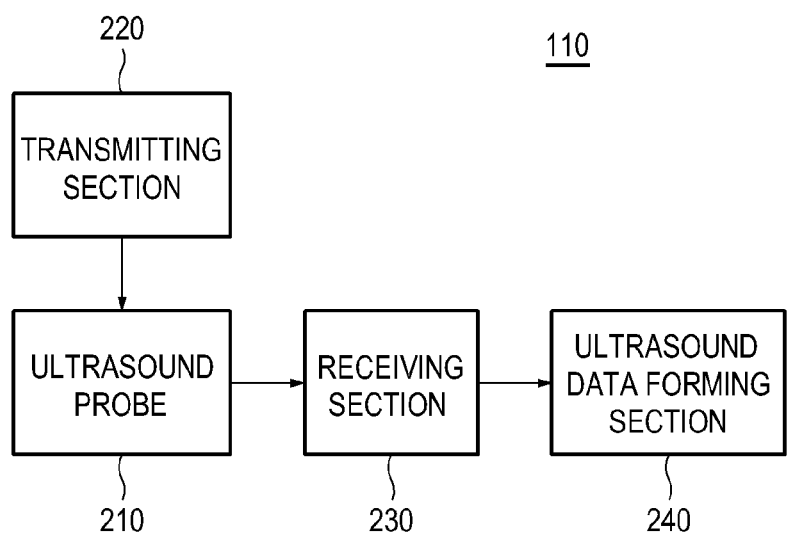
FIG. 2 is a block diagram showing an illustrative embodiment of an ultrasound data acquisition unit.

FIG. 2 is a block diagram showing an illustrative embodiment of the ultrasound data acquisition unit. Referring to FIG. 2, the ultrasound data acquisition unit 110 may include an ultrasound probe 210.

The ultrasound probe 210 may include a plurality of elements (not shown) for reciprocally converting between ultrasound signals and electrical signals. The ultrasound probe 210 may be configured to transmit the ultrasound signals to the living body. The ultrasound probe 210 may be further configured to receive the ultrasound echo signals from the living body to output received signals. The ultrasound probe 210 may include a convex probe, a linear probe and the like.

The ultrasound data acquisition unit 110 may further include a transmitting section 220. The transmitting section 220 may be configured to control the transmission of the ultrasound signals. The transmitting section 220 may be further configured to generate electrical signals ("transmitting signals") for obtaining an ultrasound image in consideration of the elements and focusing points. The ultrasound image may include a brightness mode image. However, it should be noted herein that the ultrasound image may not be limited thereto. The transmitting section 220 may include a transmitting signal generating section (not shown), a transmitting delay time information memory (not shown), a transmitting beam former (not shown) and the like.

Figure 3:
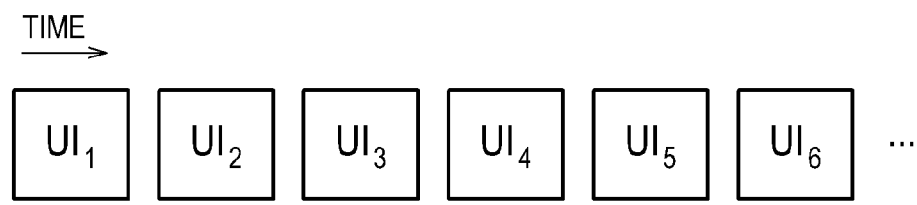
FIG. 3 is a schematic diagram showing the order of acquiring ultrasound images according to a time.

In the embodiment, the transmitting section 220 may sequentially form the transmitting signals for obtaining each of the ultrasound images $UI_i$ (i≥1), as shown in FIG. 3. Thus, the ultrasound probe 210 may convert the transmitting signals sequentially provided from transmitting section 220 into the ultrasound signals, transmit the ultrasound signals to the living body and receive the ultrasound echo signals from the living body to thereby sequentially output the received signals.

The ultrasound data acquisition unit 110 may further include a receiving section 230. The receiving section 230 may be configured to convert the received signals sequentially provided from the ultrasound probe 210 into digital signals. The receiving section 230 may be further configured to apply delays to the digital signals in consideration of the elements and the focusing points to thereby output digital receive-focused signals. The receiving section 230 may include an analog-to-digital convert (not shown), a receiving delay time information memory (not shown), a receiving beam former (not shown) and the like.

The ultrasound data acquisition unit 110 may further include an ultrasound data forming section 240. The ultrasound data forming section 240 may be configured to form ultrasound data corresponding to the ultrasound image based on the digital receive-focused signals provided from the receiving section 230. The ultrasound data may include radio frequency data. However, it should be noted herein that the ultrasound data may not be limited thereto. The ultrasound data forming section 240 may be further configured to perform a signal process (e.g., gain control, etc) upon the digital receive-focused signals.

In the embodiment, the ultrasound data forming section 240 may form the ultrasound data corresponding to each of the ultrasound images $UI_i$ (i≥1) based on the digital receive-focused signals sequentially provided from the receiving section 230.

Referring back to FIG. 1, the ultrasound system 100 may further include a processing unit 120 in communication with the ultrasound data acquisition unit 110. The processing unit 120 may include a central processing unit, a microprocessor, a graphic processing unit and the like.

Figure 4:
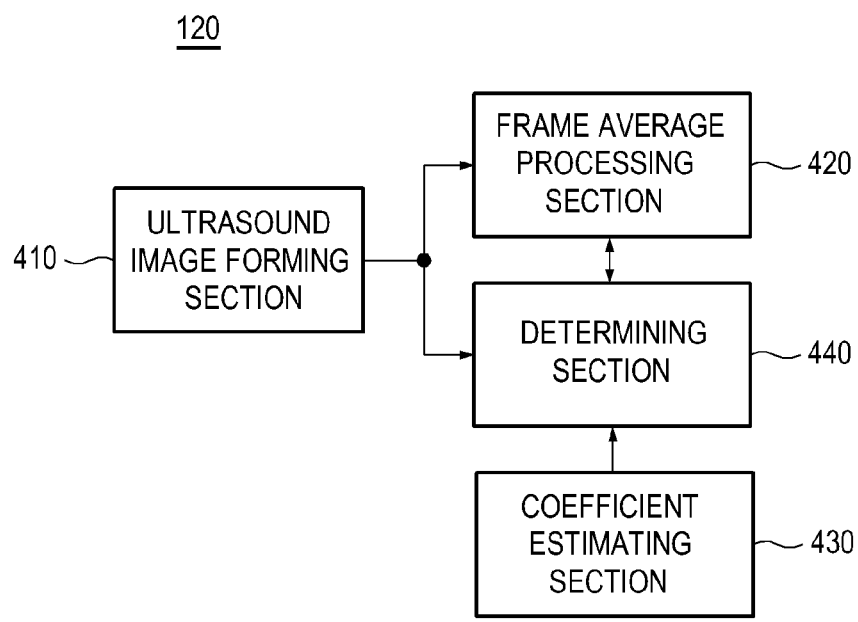
FIG. 4 is a block diagram showing an illustrative embodiment of a processing unit.

FIG. 4 is a block diagram showing an illustrative embodiment of the processing unit. Referring to FIG. 4, the processing unit 120 may include an ultrasound image forming section 410.

Figure 5:
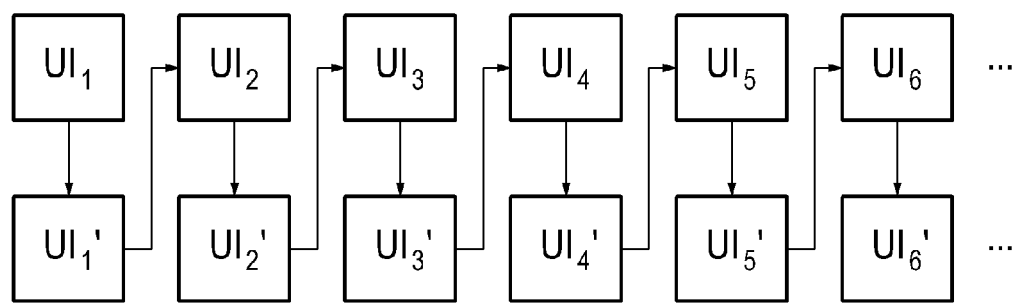
FIG. 5 is a schematic diagram showing an example of the ultrasound images and frame average images.

The ultrasound image forming section 410 may be configured to sequentially form the ultrasound images $UI_i$ (i≥1) based on the ultrasound data sequentially provided from the ultrasound data acquisition unit 110, as shown in FIG. 5.

The processing unit 120 may further include a frame average processing section 420. The frame average processing section 420 may be configured to perform a frame average process between an ultrasound image (i.e., an (i+1)$^{th}$ ultrasound image $UI_{i+1}$ (i is a positive integer)) outputted from the ultrasound image forming section 410 and a frame average image (i.e., an i$^{th}$ frame average image $UI'_i$) outputted from the frame average processing section 420 based on a frame average coefficient to form an (i+1)$^{th}$ frame average image, as shown in FIG. 5.

Figure 6:
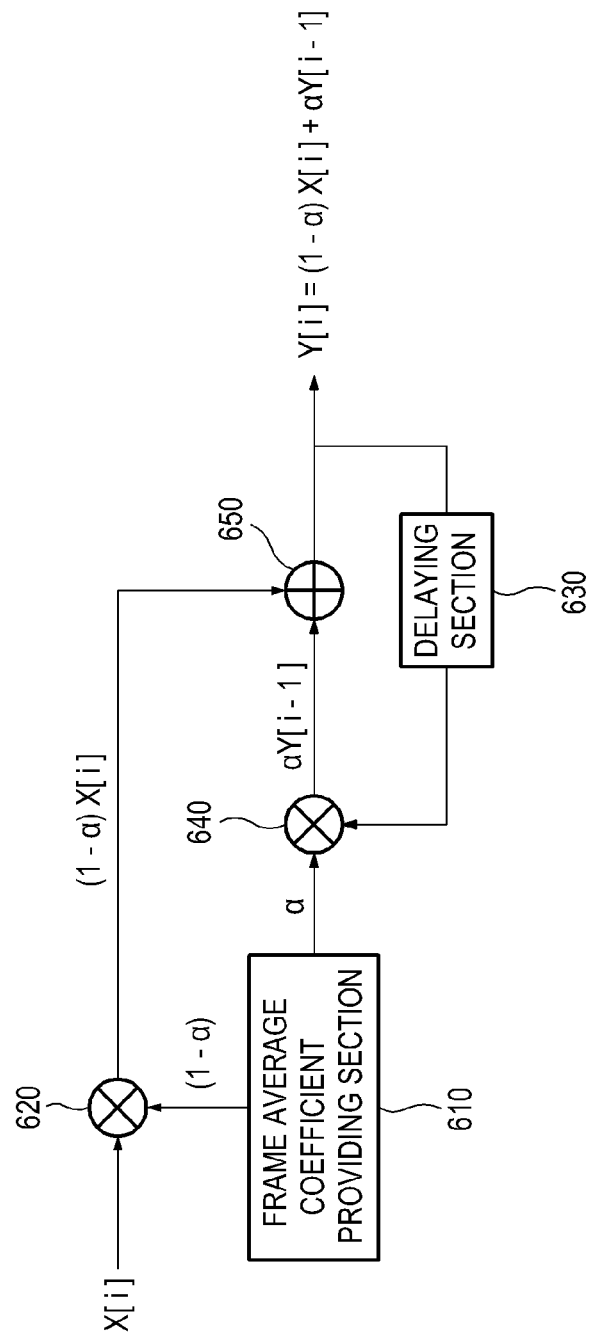
FIG. 6 is a block diagram showing an illustrative embodiment of a frame average processing section.

FIG. 6 is a block diagram showing an illustrative embodiment of the frame average processing section. Referring to FIG. 6, the frame average processing section 420 may include a frame average coefficient providing section 610.

The frame average coefficient providing section 610 may be configured to provide the frame average coefficient outputted from a coefficient estimating section 440. In the embodiment, the frame average coefficient providing section 610 may provide a first frame average coefficient (1−α) and a second frame average coefficient α, as shown in FIG. 6.

The frame average processing section 420 may further include a first multiplying section 620. The first multiplying section 620 may be configured to multiply input data with the frame average coefficient provided from the frame average coefficient providing section 610 to output first multiplying data.

In the embodiment, the first multiplying section 620 may multiply the input data X[i] with the first frame average coefficient (1−α) provided from the frame average coefficient providing section 610 to output the first multiplying data (1−α)X[i]. The input data may be the i$^{th}$ ultrasound image $UI_i$ outputted from the ultrasound image forming section 410.

The frame average processing section 420 may include a delaying section 630. The delaying section 630 may be configured to apply a delay to the frame average-processed data (i.e., output data) outputted from the frame average processing section 420.

In the embodiment, the a delaying section 630 may apply the delay to the output data Y[i−1] outputted from the frame average processing section 420. The output data Y[i−1] may be an (i−1)$^{th}$ frame average image $UI'_{i-1}$.

The frame average processing unit 420 may further include a second multiplying section 640. The second multiplying section 640 may be configured to multiply the output data outputted from the delay section 630 with the frame average coefficient provided from the frame average providing section 610 to output a second multiplying data.

In the embodiment, the second multiplying section 640 may multiply the output data Y[i−1] outputted from the delay section 630 with the second frame average coefficient α to output the second multiplying data αY[i−1].

The frame average processing section 420 may further include an adding section 650. The adding section 650 may be configured to add the first multiplying data outputted from the first multiplying section 620 and the second multiplying data outputted from the second multiplying section 620 to output addition data (i.e., frame average-processed data).

In the embodiment, the adding section 650 may add the first multiplying data (1−α)X[i−1] outputted from the first multiplying section 620 and the second multiplying data αY[i−1] outputted from the second multiplying section 640 to output the frame average-processed data Y[i]=αY[i−1]+(1−α)X[i−1]. The frame average-processed data Y[i] may be the i$^{th}$ frame average image $UI'_i$.

Referring back to FIG. 4, the processing unit 120 may further include a determining section 430. The determining section 430 may be configured to determine a change of a frame rate to output a determining result. For example, the determining section 430 may compare a reference frame rate with a current frame rate. If it is determined that the current frame rate is different to the reference frame rate, then the determining section 430 may output a first determining result representing that the current frame rate is different to the reference frame rate. Else if it is determined that the current frame rate is equal to the reference frame rate, then the determining section 430 may output a second determining result representing that the current frame rate is equal to the reference frame rate.

The processing unit 120 may further include the coefficient estimating section 440. The coefficient estimating section 440 may be configured to estimate the frame average coefficient corresponding to a change of the frame rate based on the determining result outputted from the determining section 430. The coefficient estimating section 440 may be further configured to provide the frame average coefficient to the frame average processing section 420. Thus, the frame average processing section 420 may perform the frame average process between the ultrasound image outputted from the ultrasound image forming section 410 and the frame average image outputted from the frame average processing section 420 based on the frame average coefficient provided from the coefficient estimating section 440.

Figure 7:
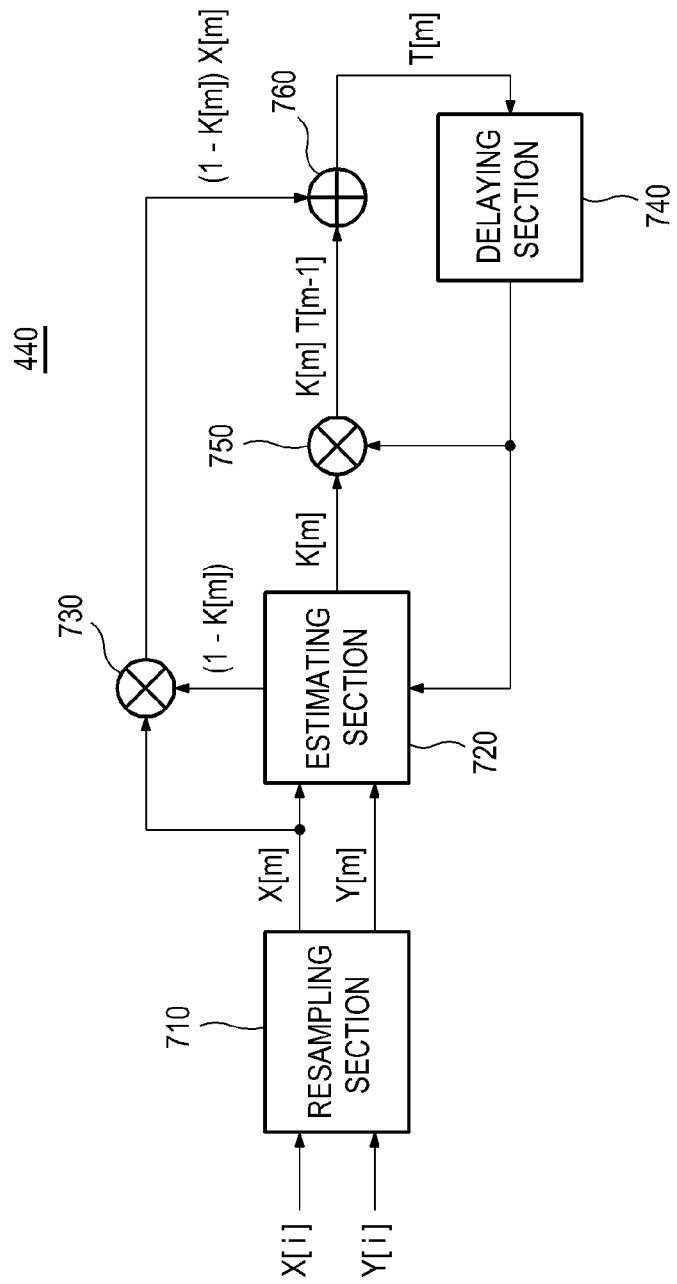
FIG. 7 is a block diagram showing an illustrative embodiment of a coefficient estimating section.

FIG. 7 is a block diagram showing an illustrative embodiment of the coefficient estimating section. Referring to FIG. 7, the coefficient estimating section 440 may include a resampling section 710.

The resampling section 710 may be configured to set a sampling rate corresponding to the current frame rate based on the determining result outputted from the determining section 430. For example, the resampling section 710 may set the current frame rate as the sampling rate of a filter.

In the embodiment, the resampling section 710 may set the sampling rate corresponding to the current frame rate based on the first determining result outputted from the determining section 430. The resampling section 710 may not set the sampling rate based on the second determining result outputted from the determining section 430. That is, the resampling section 710 may set the sampling rate, which has been previously set the resampling section 710, as the sampling rate corresponding to current frame rate based on the second determining result.

The resampling section 710 may be further configured to resample the input data X[i], Y[i] based on the sampling rate to output resampling data X[m], Y[m], as shown in FIG. 7. The input data X[i] may be the $i^{th}$ ultrasound image $UI_i$ outputted form the ultrasound image forming section 410. The input data Y[i] may be the $i^{th}$ frame average image $UI'_i$ outputted from the frame average processing section 420. The resampling section 710 may be further configured to perform an interpolation process upon the resampling data.

The coefficient estimating section 440 may further include an estimating section 720. The estimating section 720 may be configured to estimate the frame average coefficient based on the resampling data X[m], Y[m] and the output data T[m] outputted from the coefficient estimating section 440, as shown in FIG. 7.

For example, the estimating section 720 may estimate the frame average coefficient K[m] by using equation 1 provided below. The frame average coefficient K[m] may represent an average value of the frame average coefficient corresponding to each of the sample data.

$$K[m] = \frac{Y[m] - X[m]}{T[m-1] - X[m]} \quad (1)$$

The coefficient estimating section 440 may further include a third multiplying section 730. The third multiplying section 730 may be configured to multiply the frame average coefficient outputted from the estimating section 720 with the resampling data outputted from the resampling section 710 to output third multiplying data.

In the embodiment, the third multiplying section 730 may multiply the frame average coefficient (1−K[m]) outputted from the estimating section 720 with the resampling data X[m] outputted from the resampling section 710 to output third multiplying data (1−K[m])X[m], as shown in FIG. 7.

The coefficient estimating section 440 may further include a delaying section 740. The delaying section 740 may be configured to apply a delay to the output data outputted from the coefficient estimating section 440. In the embodiment, the delaying section 740 may apply the delay to the output data T[m−1] outputted from the coefficient estimating section 440, as shown in FIG. 7.

The coefficient estimating section 440 may further include a fourth multiplying section 750. The forth multiplying section 750 may be configured to multiply the output data outputted from the delaying section 740 with the frame average coefficient outputted from the estimating section 720.

In the embodiment, the fourth multiplying section 750 may multiply the output data T[m−1] outputted from the delaying section 740 with the fourth frame average coefficient K[m] to output the fourth multiplying data K[m]T[m−1].

The coefficient estimating section 440 may further include an adding section 760. The adding section 760 may be configured to add the third multiplying data outputted from the third multiplying section 730 and the fourth multiplying data outputted from the fourth multiplying section 740 to output the output data (i.e., output data).

In the embodiment, the adding section 760 may add the third multiplying data (1−K[m])X[m] provided from the third multiplying section 730 and the fourth multiplying data K[m]T[m−1] provided from the fourth multiplying section 740 to output the output data T[m]=K[m]T[m−1]+(1−K[m])X[m].

Referring back to FIG. 1, the ultrasound system 100 may further include a storage unit 130. The storage unit 130 may store the ultrasound data acquired by the ultrasound data acquisition unit 110. The storage unit 130 may further store the plurality of ultrasound images formed by the processing unit 120.

The ultrasound system 100 may further include a display unit 140. The display unit 140 may be configured to display the ultrasound images formed by the processing unit 120. The display unit 140 may be further configured to display the frame average images formed by the processing unit 120.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
   an ultrasound data acquisition unit configured to sequentially acquire ultrasound data corresponding to a living body; and
   a processing unit, comprising:
      an ultrasound image forming section configured to form a plurality ultrasound image based on the ultrasound data;

a determining section configured to compare a reference frame rate and a current frame rate to output a determining result;

a coefficient estimating section including a resampling section and an estimating section and configured to output a frame average coefficient for image data in a frame average process based on the determining result, the resampling section being configured to resample an $i^{th}$ ultrasound image (i is a positive integer) and an $i^{th}$ frame average image at a sampling rate equal to the current frame rate based on the determining result to form first resampling data from the $i^{th}$ ultrasound image and to form second resampling data from the $i^{th}$ frame average image, the estimating section being configured to estimate the frame average coefficient based on the first resampling data and the second resampling data; and a frame average processing section configured to form an $(i+1)^{th}$ frame average image by performing the frame average process between the $i^{th}$ frame average image and an $(i+1)^{th}$ ultrasound image based on the frame average coefficient outputted from the coefficient estimating section, wherein the frame average processing section comprises:

a first multiplying section configured to multiply the frame average coefficient with the first resampling data to output first multiplication data;

a delaying section configured to apply a delay to the $(i)^{th}$ frame average image to output a delayed $i^{th}$ frame average image;

a second multiplying section configured to multiply the frame average coefficient with the the delayed $i^{th}$ frame average image to output second multiplication data; and an adding section configured to add the first multiplication data and the second multiplication data to output the $(i+1)^{th}$ frame average image.

2. The ultrasound system of claim 1, wherein the determining section is configured to:

when it is determined that the reference frame rate is different from the current frame rate, output a first determining result; and when it is determined that the reference frame is equal to the current frame rate, output a second determining result.

3. The ultrasound system of claim 1, wherein the frame average processing section comprises:

a first multiplying section configured to multiply the frame average coefficient with the $i^{th}$ ultrasound image to output third multiplication data;

a delaying section configured to apply a delay to the $i^{th}$ frame average image;

a second multiplying section configured to multiply the frame average coefficient with the delayed $i^{th}$ frame average to output fourth multiplication data; and an adding section configured to add the third multiplication data and the fourth multiplication data to output the $(i+1)^{th}$ frame average image.

* * * * *